(12) United States Patent
Kawano et al.

(10) Patent No.: US 6,430,116 B1
(45) Date of Patent: Aug. 6, 2002

(54) MAGNETO-OPTICAL STORAGE MEDIUM HAVING FIRST AND SECOND RECORDING LAYERS

(75) Inventors: Toshifumi Kawano; Akio Okamuro, both of Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/565,555

(22) Filed: May 5, 2000

(30) Foreign Application Priority Data

| May 11, 1999 | (JP) | ......................................... | 11-129856 |
| Oct. 4, 1999 | (JP) | ......................................... | 11-282876 |
| Dec. 27, 1999 | (JP) | ......................................... | 11-368906 |

(51) Int. Cl.[7] .............................................. G11B 11/00
(52) U.S. Cl. ................................ 369/13.45; 369/13.44; 428/694 MM
(58) Field of Search ........................... 369/13.45, 13.44, 369/13.46, 13.49, 13.5, 13.51, 13.41, 13.35; 428/694 ML, 694 MM, 694 RE

(56) References Cited

U.S. PATENT DOCUMENTS

| 5,233,575 A | | 8/1993 | Uchino et al. | |
| 5,486,395 A | * | 1/1996 | Murakami et al. | ............. 369/13 |
| 5,621,706 A | | 4/1997 | Kawano et al. | |
| 5,719,829 A | * | 2/1998 | Nishimura | ................... 369/13 |
| 5,757,736 A | * | 5/1998 | Onagi | .......................... 369/13 |
| 5,850,383 A | | 12/1998 | Kawano | |
| 5,871,855 A | * | 2/1999 | Izumi et al. | ......... 428/694 ML |
| 5,970,027 A | | 10/1999 | Narita et al. | |
| 5,982,715 A | * | 11/1999 | Mori et al. | .................... 369/13 |
| 6,033,752 A | * | 3/2000 | Suzuki et al. | .................. 369/13 |

FOREIGN PATENT DOCUMENTS

EP          0 965 987          12/1999

* cited by examiner

*Primary Examiner*—Tan Dinh
(74) *Attorney, Agent, or Firm*—Oblon, Spivak, McClelland, Maier & Neustadt, P.C.

(57) ABSTRACT

A magneto-optical recording medium having a writing layer, a switching layer and a readout layer on a substrate, wherein a magnetization direction corresponding to information is written in the writing layer, and the magnetization direction of the writing layer is transferred to the readout layer by a magnet static coupling force from the writing layer at a temperature of at least room temperature, and wherein the writing layer is composed of a plurality of layers which are made of alloys of a rare earth metal and a transition metal and which are exchange-coupled one another, including a layer having rare earth metal dominant magnetization at room temperature and a layer having transition metal dominant magnetization at room temperature.

11 Claims, 5 Drawing Sheets

MAGNETO-OPTICAL STORAGE MEDIUM HAVING FIRST AND SECOND RECORDING LAYERS

BACKGROUND OF THE INVENTION

1. Field of the Invention

The present invention relates to a magneto-optical recording medium to be used for information recording and a writing and readout method therefor, and a writing and readout apparatus.

2. Discussion of Background

Magneto-optical recording media are media designed to record information in a magnetic layer as a magnetization direction. They are rewritable with high densities and of low costs, and they are used, for example, as information recording media for e.g. external memory apparatus for computers or for apparatus for recording and replaying music. Among them, a magneto-optical recording medium employing a writing layer made of an amorphous alloy of a rare earth metal or a transition metal, exhibits excellent properties. A magneto-optical disk having a large recording capacity is practically available even now, but in view of the ever increasing quantity of information of the society, modification for a larger capacity is desired. The limit in the recording density of a magneto-optical disk is usually determined by the size of the spot of the readout laser beam. The size of the spot can be made smaller, as the wavelength of the laser is shorter. Accordingly, a study has been made for shortening the wavelength of the laser but with difficulty, and use of a short wavelength laser is a factor for a high cost. On the other hand, attempts for so-called super resolution have been made in recent years, in which it is attempted to obtain a resolution higher than the level determined by the wavelength of the laser, by various measures.

As one of such attempts, a system for magnetically induced super resolution (hereinafter referred to also as MSR) has been reported which employs an exchange coupling force among magnetic layers of a multi-layered structure in a magneto-optical disk.

This system consists essentially of a layer for information recording (a writing layer) and a layer for information readout (a readout layer), whereby writing is carried out against the writing layer, and at the time of readout, the magnetization direction of the writing layer is transferred to the readout layer, and the magnetization direction of the readout layer is readout. Usually, the transferability to the readout layer is controlled by the temperature for heating a magnetic layer of the writing layer or the like.

According to this system, the temperature distribution in a readout laser beam spot is utilized to modify the magnetic domain of the readout layer, whereby the waveform interference of readout signals can be reduced, and high density recorded information can be readout with good quality.

The MSR system includes, for example, one utilizing magnet static coupling and one utilizing exchange coupling.

As one of the MSR systems employing magnet static coupling, the present inventors have proposed in JP-A-7-147029 a system so-called "reversal type MSR" which employs a medium comprising mutually exchange-coupled three layers i.e. a readout layer having a small coercivity, a switching layer having a low Curie temperature and a writing layer having a high Curie temperature and a large coercivity.

Here, each of the readout layer and the writing layer is made of an alloy of a transition metal and a rare earth metal. Magnetization of each layer is determined by the sub-lattice magnetization of the rare earth metal and the sub-lattice magnetization of the transition metal.

A composition in which the magnetization of the rare earth metal and the magnetization of the transition metal cancel out each other, is called a compensation composition, and a composition containing the transition metal in a larger amount than the compensation composition is called transition metal magnetization dominant (hereinafter referred to also as transition metal rich or TM rich), whereby the overall magnetization agrees to the transition metal magnetization. A composition containing the rare earth metal in a larger amount than the compensation composition is called rare earth metal magnetization dominant (hereinafter referred to also as rare earth rich or RE rich), whereby the overall magnetization agrees to the rare earth metal magnetization.

In the reversal type MSR system, at a low temperature portion within the spot of readout laser beam, the readout layer and the writing layer are exchange-coupled via the switching layer. In the exchange coupling, the direction of the sub-lattice magnetization of the readout layer agrees to the direction of the sub-lattice magnetization of the writing layer.

On the other hand, at a high temperature portion, the temperature of the switching layer exceeds the Curie temperature of the switching layer, whereby the exchange coupling of the readout layer and the writing layer will be cut off. Accordingly, in the relation between the readout layer and the writing layer, the magnet static coupling tends to be governing, whereby the magnetization direction of the readout layer agrees to the magnetization direction of the writing layer. If both the readout layer and the writing layer are TM rich, the magnetization directions of the readout layer and the writing layer will always be the same.

However, when the dominant magnetizations differ, for example, in a case where the readout layer is RE rich, while the writing layer is TM rich, the magnetization state in the readout layer will be opposite as between a case where the sub-lattice magnetization directions of the readout layer and the writing layer agree to each other and a case wherein the magnetization direction of the readout layer and the writing layer agree to each other.

Namely, when the medium is heated under irradiation with a readout beam, firstly at a low temperature portion, magnetization of the readout layer will appear due to the exchange coupling with the writing layer, and when it is further heated to a high temperature, the exchange coupling is cut off, whereby the magnetization of the readout layer will be reversed.

In high density recording, this reversed magnetization serves to intensify the signal together with the non-reversed adjacent mark, whereby high resolution can be realized.

In a reversal type MSR system, like a magnetic disk, the signal intensity becomes maximum at the edge of the mark (at the boundary of a magnetic domain) rather than the center of the mark (the magnetic domain), whereby the mark edge can easily be detected by detecting the peak position of the signal. Accordingly, there is an economical merit in that readout of a mark length modulation recording signal can be carried out by utilizing an inexpensive signal-detecting circuit which is commonly used in a magnetic disk apparatus.

Further, as another type of a MSR system employing magnet static coupling, a system so-called "static coupled CAD" has been proposed wherein a readout layer which has in-plane magnetization at a low temperature and which becomes a perpendicular magnetization film as the temperature becomes high and as the magnetization becomes small, is employed as the readout layer, a non-magnetic barrier layer is provided between the writing layer and the readout layer, and the magnetization direction of the writing layer is transferred to the readout layer solely by the magnet static coupling force.

In the static coupled CAD system, only at a high temperature, the magnetization of the writing layer will be transferred to the readout layer, and the signal can be readout. This system is excellent in that at a low temperature, no transfer of the magnetization direction of the writing layer will take place, and the layer remains to be an in-plane magnetization film, whereby a so-called low temperature mask will be formed, and the signal interference (cross talk) with the formed adjacent tracks can be minimized.

On the other hand, as a MSR system utilizing only exchange coupling without employing magnet static coupling, a system so-called "exchange-coupled CAD" is available wherein a readout layer which has in-plane magnetization at a low temperature and which becomes a perpendicular magnetization film as the temperature becomes high and as the magnetization decreases, is used as the readout layer, and the readout layer and the writing layer are exchange-coupled, so that the magnetization direction is transferred to the readout layer.

However, in such an exchange-coupled CAD system, if the readout layer is made to have a composition so that it becomes a perpendicular magnetization film at a high temperature, it becomes difficult to make it a completely in-plane magnetization film at a low temperature due to the strong exchange coupling with the writing layer. And, the boundary between the in-plane magnetization region and the perpendicular magnetization region becomes obscure, and the resolution of the readout signal tends to be low. If it is attempted to make the readout layer an in-plane magnetization film at a low temperature, it will be required to make the layer substantially thick, thus leading to an increase of the production cost of such media and a decrease in the recording sensitivity.

Accordingly, a MSR system utilizing magnet static coupling is superior from the viewpoint of the readout resolution.

In a system (hereinafter generally referred to as static coupled MSR) for transferring the magnetization direction of a writing layer to a readout layer by utilizing magnet static coupling like the above-mentioned "reversal type MSR" or "static coupled CAD", it is necessary to increase the leakage flux from the writing layer to the readout layer, which is the source for the magnet static coupling, in order to carry out the readout efficiently.

For this purpose, the magnetization of the writing layer and the readout layer may be increased.

However, it has been found that a new problem will be brought about if such a composition suitable for readout, is employed.

Such a problem will be described with reference to a medium of a reversal type MSR system wherein a readout layer is RE rich, and a writing layer is TM rich.

The magnetization of the writing layer can be made large by shifting the compositional ratio of the rare earth metal and the transition metal in the writing layer substantially to the TM rich side from the compensation composition. However, if the magnetization of the writing layer is made large, the magnetization recorded in the writing layer during the writing, tends to undergo magnetization reversal to an unintended direction.

Namely, in a region of the writing layer wherein the magnetization is consistent in a uniform direction, the magnetic flux from a surface magnetic pole of the writing layer forms a de-magnetization field in the interior of the writing layer. Such a de-magnetization field acts against the surrounding as a force to form reversed magnetization. Accordingly, if a part of the writing layer is heated during the writing, and the coercivity decreases, a strong de-magnetization field from the surrounding writing layer not so heated, will be effective to cause magnetization reversal. Therefore, the magnetization is likely to be shifted to an unintended direction, when no external magnetic field is applied during recording, or against an external magnetic field, even if such an external magnetic field is applied.

As the magnetization given to the writing layer increases, this de-magnetization field simultaneously increases, and the above described magnetization reversal tends to occur during the writing. Accordingly, large magnetization for writing/erasing will be required to overcome the de-magnetization field at the time of writing/erasing.

This is problematic not only in a reversal type MSR system but also in any MSR system utilizing magnet static coupling.

Writing systems for magneto-optical recording media include a light intensity modulation method and a magnetic field modulation method.

The former is a system in which usually, erasing is carried out once to align the magnetization in one direction, and then a writing magnetic field in a reversed direction is applied, and writing is carried out by changing the intensity of irradiated light. The latter is a system wherein the light intensity is maintained to be constant or in a pulse form, and writing is carried out by changing (reversing) the writing magnetic field.

The magnetization reversal due to the de-magnetization field is extremely inconvenient especially for the magnetic field modulation system.

In order to carry out the writing accurately, it is necessary to set the writing magnetic field stronger than the de-magnetization field, as mentioned above. However, if the writing magnetic field is increased, it tends to be difficult to change (reverse) the magnetic field at a high speed, whereby the magnetic field intensity tends to be inadequate.

In order to carry out the writing at a high speed, the magnetic field intensity is obliged to be weak, whereby there will be a problem of an unintended magnetization reversal due to the de-magnetization field.

Also in the light intensity modulation system, the surrounding de-magnetization field is convenient when a writing magnetic domain is to be formed at a region once erased to align the magnetic field in one direction, but if a large de-magnetization field is present excessively, there will be a problem that it tends to be difficult to carry out erasing uniformly.

To reduce the de-magnetization field, magnetization of the writing layer may be made small, and it has been believed that with conventional media, a composition close to the compensation composition is suitable.

However, with such a composition, the leakage flux at the time of readout will also decrease, which adversely affects the readout characteristics on a principle of a system employing a magnet static coupling. Specifically, no adequate transfer of the magnetization direction to the readout layer tends to be carried out.

Namely, in a conventional MSR system employing a magnet static coupling, it has been difficult to satisfy both satisfactory transferability from the writing layer to the readout layer at the time of the readout and a reduction in the writing magnetic field at the time of the writing.

SUMMARY OF THE INVENTION

It is an object of the present invention to solve such a problem and satisfy both the satisfactory transferability from the writing layer to the readout layer at the time of the readout and the writing with a low writing magnetic field, and to provide a magneto-optical recording medium excellent in both the readout characteristics and the writing characteristics, particularly a magneto-optical recording medium suitable for a magnetic field modulation system and a writing and readout method therefor, and a writing and readout apparatus.

As a result of a study, the present inventors have found it possible to satisfy both writing with a low writing magnetic field and satisfactory transferability to the readout layer by having the writing layer composed of a plurality of layers having different characteristics.

Namely, the present invention provides a magneto-optical recording medium having a writing layer, a switching layer and a readout layer on a substrate, wherein a magnetization direction corresponding to information is written in the writing layer, and the magnetization direction of the writing layer is transferred to the readout layer by a magnet static coupling force from the writing layer at a temperature of not lower than room temperature, and wherein the writing layer is composed of a plurality of layers which are made of alloys of a rare earth metal and a transition metal and which are exchange-coupled one another, including a layer having rare earth metal dominant magnetization at room temperature and a layer having transition metal dominant magnetization at room temperature.

Here, room temperature is usually meant for 25° C.

Further, the present invention provides a writing method for a magneto-optical recording medium, wherein such a magneto-optical recording medium is used, and writing of information thereon is carried out by a magnetic field modulation system.

Still further, the present invention provides a writing and readout apparatus comprising such a magneto-optical recording medium and a flying type or contact type magnetic head.

DETAILED DESCRIPTION OF THE PREFERRED EMBODIMENTS

Figure 1:
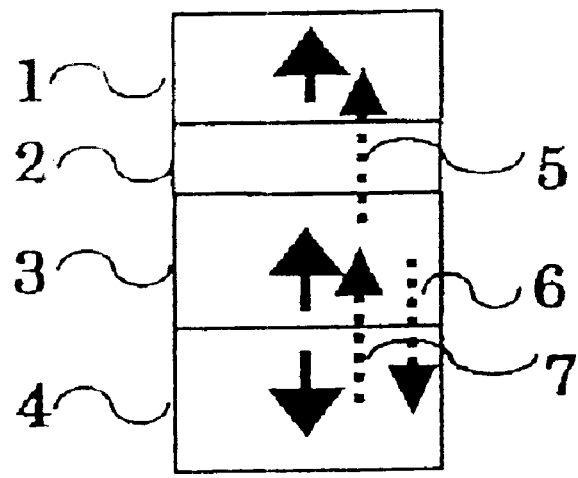
FIG. 1 is a view illustrating the mechanism of a static coupled MSR medium of the present invention.

Now, the present invention will be described in detail with reference to the preferred embodiments.

With a static coupled MSR medium, if the magnetic field created by the magnetization of the writing layer is weak, the transfer to the readout layer at the time of the readout will be incomplete. On the other hand, if the magnetic field created by the magnetization of the writing layer is strong, a strong magnetic field will be required at the time of writing/erasing.

In the present invention, an attention has been drawn to the fact that the temperature at the magnetic field-created portion of the writing layer differs between such two cases, and the writing layer is made to be composed of a plurality of layers i.e. at least two layers, differing in the characteristics, so that the magnetic field at room temperature will be weak, and the magnetic field at a high temperature will be strong, thereby to satisfy both writing with a low writing magnetic field and satisfactory transferability to the readout layer. If required, the writing layer may be at least three layers, but from the convenience for production, the writing layer is preferably composed of two layers. In the following, the present invention will be described with reference to a case where the writing layer is composed of two layers.

The medium of the present invention is suitable especially for a magnetic field modulation system.

The de-magnetization field which becomes problematic in writing/erasing, is given not from the heated region itself but from the surrounding room temperature region. Accordingly, it becomes possible to reduce the writing/erasing magnetic field by suppressing the magnetic field at room temperature.

On the other hand, transfer of the magnetization of the writing layer to the readout layer at the time of the readout, is carried out at a temperature substantially higher than room temperature. Accordingly, setting may be made to intensify the magnetic field at that temperature.

In the present invention, in order to realize such characteristics, the writing layer is composed of a plurality of layers which are made of alloys of a rare earth metal and a transition metal and which are exchange-coupled one another, and it includes at least a layer (RE rich layer) having rare earth metal dominant magnetization at room temperature and a layer (TM rich layer) having transition metal dominant magnetization at room temperature.

At room temperature, the de-magnetization field created by the RE rich layer and the de-magnetization field created by the TM rich layer will cancel out each other, whereby the de-magnetization field can be made small at room temperature. On the other hand, with respect to the magnet static coupling force, the force from a writing layer closest to the readout layer is far strong, and it will receive no substantial influence of other writing layers and can maintain the strong magnet coupling force.

By such a series of functions, both the low de-magnetization field at room temperature and the high magnet static coupling force at the readout temperature can be satisfied.

Now, the present invention will be described with reference to the drawings.

Figure 2:
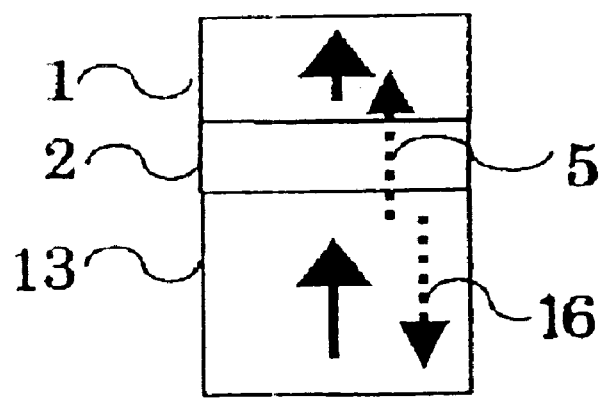
FIG. 2 is a view illustrating the mechanism of a conventional static coupled MSR medium.

FIG. 2 shows an example of the layer structure of a conventional magneto-optical recording medium. It comprises a readout layer 1, a switching layer 2 and a writing layer 13, wherein a magnet static coupling force 5 and a de-magnetization field 16 of the writing layer are functioning among the respective layers.

As mentioned above, if the magnetization of the writing layer is increased, the de-magnetization field 16 will increase, and the writing magnetic field required for writing/erasing will also increase. Inversely, if the magnetization of the writing layer is reduced, the magnet static coupling force 5 tends to be small, which adversely affects the readout. This may be explained, as both the magnet static coupling force 5 and the de-magnetization field 16 will be generated from a surface magnetic pole of the writing layer alike.

Here, with regard to the difference between the de-magnetization field 16 and the magnet static coupling force 5 shown in FIG. 2, the de-magnetization field 16 is a force which a part of the writing layer 13 will receive from the surrounding writing layer itself, whereas the magnet static coupling force 5 is a force between the writing layer 13 and the readout layer 1. In the writing layer, magnetic poles will be formed on both surfaces (in the case of a writing layer of a multi-layer structure, magnetic poles will be formed also between the writing layers), and the de-magnetization field 16 of the writing layer itself will be influenced by the magnetic fields from all magnetic poles.

On the other hand, FIG. 1 shows an example of the layer structure of a magneto-optical recording medium of the present invention. It comprises a readout layer 1, a switching layer 2, a first writing layer 3 and a second writing layer 4, wherein a magnet static coupling force 5, a de-magnetization field 6 of the first writing layer and a de-magnetization field 7 of the second writing layer are functioning among the respective layers. The layer close to the readout layer is called a first writing layer, and the layer remote therefrom is called a second writing layer.

As shown in FIG. 1, when the writing layer is made to have two layers so that the first writing layer 3 has transition metal dominant magnetization and the second writing layer 4 has rare earth metal dominant magnetization, and they are mutually exchange-coupled, the de-magnetization fields 6 and 7 from the respective layers will cancel out each other, whereby the sum can be made small. The majority of the de-magnetization field will be generated from a room temperature portion around the writing portion (the heated portion), and it is necessary to reduce the magnetization at room temperature. Accordingly, it is preferable that at room temperature, the first writing layer 3 has transition metal dominant magnetization, and the second writing layer 4 has rare earth metal dominant magnetization. Here, room temperature is typically about 25° C.

On the other hand, the magnet static coupling force 5 is for coupling with the readout layer 1 located outside the writing layer, and the influence thereon of the magnetic field from the first writing layer 3 close to the readout layer 1 (i.e. the influence of the magnetic flux of the magnetic pole of the surface of the writing layer on the readout layer side) is far stronger than the influence thereon from the second writing layer 4 located far from the readout layer. This should be readily understood if the fact that the intensity of a magnetic field is inversely proportional to the square of the distance, is taken into consideration. Accordingly, by employing a laminate of the first writing layer 3 having transition metal predominant magnetization and the second writing layer 4 having rare earth metal predominant magnetization, it is possible to suppress the sum of the writing layer magnetizations and consequently to reduce the de-magnetization field (the sum of the de-magnetization fields 6 and 7), while maintaining the strong magnet static coupling force.

With an alloy of a rare earth metal and a transition metal, when the temperature is raised, reduction of the rare earth metal magnetization usually takes place quickly, and it undergoes a change from rare earth metal dominant magnetization to transition metal dominant magnetization. A temperature at which the magnetizations of a rare earth metal and a transition metal will completely counterbalance, is called a compensation temperature. At a temperature lower than this compensation temperature, it will be rare earth metal magnetization dominant, and at a temperature higher than this, it will be transition metal magnetization dominant. Accordingly, if the readout is carried out while the temperature of the medium is increased, in the writing layer, the transition metal magnetization will be strong as a whole, whereby it is possible to obtain a stronger magnet static coupling force than at room temperature.

In the present invention, by such a structure, it is possible to satisfy both satisfactory transferability from the writing layer to the readout layer at the time of the readout and writing with a low writing magnetic field and to provide a magneto-optical recording medium excellent in both the readout characteristics and the writing characteristics.

The magneto-optical recording medium of the present invention exhibits good writing characteristics in either a light intensity modulation system or a magnetic field modulation system. However, it is particularly effective when used for a magnetic field modulation system, since low magnetic field writing will thereby be possible, and high speed writing will thereby be possible.

Preferably, writing is carried out at a writing magnetic field intensity of at most 300 Oe, whereby the magnetic field can be switched at a high speed, and writing at a high speed can readily be carried out. More preferably, the writing magnetic field intensity is at most 250 Oe.

When it is desired that a magnetic field of rare earth metal dominant magnetization is generated from a writing layer so that the writing layer is static coupled with a readout layer, the first writing layer may be made to be rare earth metal magnetization dominant, while the second writing layer may be made to be transition metal magnetization dominant. In such a case, as the temperature rises, the magnetization of the first writing layer decreases, which is effective for use in a MSR system whereby the magnetic static coupling force at a high temperature is desired to be made small.

The present invention is useful for a medium employing magnet static coupling, which may not necessarily be a medium which brings about super resolution. In the following, the characteristics of each layer of the medium will be described in further detail with reference to reversal type MSR and static coupled CAD. Reversal type MSR is particularly preferred, since a strong readout signal can thereby be obtained, and consequently, a high CN ratio can be obtained.

Now, each layer of the magneto-optical recording medium of the present invention will be described in detail.

In the present invention, the writing layer is composed of a plurality of layers i.e. at least two layers and has both a transition metal magnetization dominant layer and an rare earth metal magnetization dominant layer. The two layers are mutually exchange-coupled. If these layers are laminated by a conventional method such as sputtering, an exchange-coupled laminate film will usually be obtained.

At room temperature, the respective magnetizations will cancel out each other to bring about a state where no magnetic wall exists between the layers, and the overall magnetization of the writing layer is preferably at most 100 emu/cc, more preferably at most 80 emu/cc.

In static coupled CAD, the writing layer as a whole may be rare earth metal magnetization dominant or transition metal magnetization dominant. However, in the case of rare earth metal magnetization dominant, there is a problem such that the magnetization decreases when the readout is carried out at a high temperature, and accordingly, it is preferred that the writing layer is transition metal magnetization dominant at room temperature.

In the present invention, "the magnetization direction of a writing layer" is meant for the magnetization direction led from the direction of the magnet static coupling force which the writing layer composed of a plurality of layers will exert as a whole to the readout layer.

For example, when the magnetization direction is transferred to a RE rich read out layer, if the sub-lattice magnetizations of the readout layer and the writing layer are uniform, the writing layer is judged to be RE rich, and if they are inverse, the writing layer is judged to be TM rich.

On the other hand, in the case of reversal type MSR, the first writing layer closest to the readout layer is preferably transition metal magnetization dominant at room temperature, since it is desired that to a rare earth metal magnetization dominant readout layer, the opposite magnetization of transition metal predominant magnetization is coupled.

If the magnetizations of the respective writing layers are too strong, the readout signal characteristics tend to deteriorate due to a decrease of the perpendicular magnetic anisotropy. Accordingly, it is not advisable to employ a composition extremely departing from the compensation composition for the writing layer.

Accordingly, a transition metal magnetization dominant layer in the writing layer preferably contains at least 16%, more preferably at least 18%, further preferably at least 19%, most preferably at least 20%, of a rare earth metal. The upper limit of the rare earth metal composition is the compensation composition.

A rare earth metal magnetization predominant layer preferably has a rare earth metal content of at most 32%, more preferably at most 31%, most preferably from 26% to 30%. The lower limit of the rare earth metal composition is the compensation composition. In this specification, atomic % is used for all compositions.

Writing layers are layers to store records stably, and at least one layer is required to have a high Curie temperature so that it will not deteriorate under heating by the readout laser beam, preferably at least 200° C., more preferably at least 250° C. If the Curie temperature is low, the readout power margin will be zero or tends to be narrow. However, it is too high, the laser power required for writing tends to be very large. Therefore, the Curie temperature is preferably at most 350° C.

Of the two of writing layers, at least one writing layer preferably has a high coercivity and is capable of storing records stably. Here, the coercivity is a coercivity at room temperature. The coercivity of the high coercivity layer is preferably at least 5 kOe.

If the high coercivity layer is transition metal magnetization dominant, the coercivity will decrease at the time of the readout, and the records tend to be lost. Accordingly, the high coercivity layer is preferably rare earth metal magnetization dominant.

As such a high coercivity layer, TbFeCo, TbCo, DyFeCo, TbDyFeCo, GdTbFe or GdTbFeCo, may, for example, be preferably employed. Among them, TbFeCo is particularly preferred, since the perpendicular magnetic anisotropy is high, and the coercivity is large.

A layer other than the high coercivity layer is preferably one having a small coercivity by itself, most preferably substantially zero, so long as it is exchange-coupled with the high coercivity layer. As such a layer, GdFe, GdFeCo or GdCo may, for example, be employed.

When TbFeCo is employed as the high coercivity writing layer in the writing layer, the proportion of Co in FeCo is preferably from 10% to 40% in order to obtain a suitable Curie temperature.

A writing layer comprising a combination of a low coercivity layer having a high Curie temperature as the first writing layer and a high coercivity layer having a Curie temperature lower than the first writing layer, as the second writing layer, is particularly preferred, since a strong magnet static coupling can be obtained without a decrease of the magnetization of the first writing layer even when the temperature is raised to about the Curie temperature of the second writing layer at the time of the readout. In such a case, specifically, GdFeCo is preferably employed as the first writing layer, and TbFeCo is preferably employed as the second writing layer. In a case where the writing layer is a combination of a layer having a low coercivity (such as GdFeCo) and a layer having a high coercivity (such as TbFeCo), if recording is made on the high coercivity layer, it will be transferred to the low coercivity layer by the exchange coupling force, and therefore, the writing sensitivity is determined by the high coercivity layer.

Accordingly, if the Curie temperature of the high coercivity layer is too high, the laser power required for writing tends to be too large. Therefore, the Curie temperature of the high coercivity layer should preferably be low. Further, it is also necessary that the writing layer has a high perpendicular magnesium anisotropy, so that a strong power is imparted to the magnetization of the readout layer.

If each writing layer is thin, it tends to be difficult to transfer the magnetization direction stably to another writing layer. Accordingly, the thickness of each writing layer is preferably at least 20 nm, more preferably at least 25 nm. On the other hand, if the writing layer is thick, the sensitivity and the productivity tend to deteriorate. Accordingly, the thickness of the writing layer is preferably at most 100 nm, more preferably at most 70 nm.

In a reversal type MSR medium as a preferred embodiment of the present invention, the writing layer includes a low Curie temperature layer having a Curie temperature of at most 200° C.

The reversal type MSR medium is a magneto-optical recording medium wherein a writing layer and a readout layer are exchange-coupled at room temperature, the exchange coupling between the writing layer and the readout layer is substantially cut off at a temperature higher than a predetermined temperature, and the magnetization direction of the writing layer is transferred to the readout layer by the magnetization static coupling force from the writing layer.

The reversal type MSR medium is excellent in that a strong readout signal can thereby be obtained, and consequently, a high CN ratio can thereby be obtained.

When the writing layer is composed of a low Curie temperature layer having a Curie temperature of at most 200° C. and a high Curie temperature layer having a Curie temperature higher than 200° C., the following effects can be obtained.

The low Curie temperature layer loses magnetization when heated to a temperature of at least the Curie temperature under heating at the time of the readout, and accordingly, at the time of the readout, there will be no influence of the low Curie temperature layer, and there will be no canceling out of the magnetizations of the writing layers each other. Namely, it is possible to obtain strong magnetic static coupling between the high Curie temperature layer and the readout layer. On the other hand, at room temperature, canceling out of the magnetizations takes place as described with reference to FIG. 1, whereby the sum can be made small. Thus, by this construction, it is possible to satisfy both satisfactory transferability from the writing layer to the readout layer at the time of the readout and writing with a low writing magnetic field and to obtain a magneto-optical recording medium excellent in both the readout characteristics and the writing characteristics.

When this medium is to be employed, it is preferred to carry out the readout under heating to a temperature of at least the Curie temperature of the low Curie temperature layer and not higher than the Curie temperature of another layer, at the time of the readout.

Usually, a magnet static coupling force 5 is required at a readout temperature (typically from 100° C. to 200° C.) which is substantially higher than room temperature, and accordingly, the Curie temperature of the low Curie temperature layer is preferably at most 200° C.

However, in order to adequately secure the temperature change for magnetization, the Curie temperature of the writing layer is required to be at a level higher than a certain temperature. Accordingly, the Curie temperature of a writing layer having a lower Curie temperature is preferably at least 120° C., more preferably at least 140° C.

Here, if a high Curie temperature layer is provided on the side close to the readout layer, the distance between the high Curie temperature layer and the readout layer becomes small, whereby the magnet static coupling will be intensified. This should be readily understood if the fact that the intensity of a magnetic field is inversely proportional to the square of the distance, is taken into consideration.

A combination of a high Curie temperature layer made of a layer which is transitional metal magnetic dominant at room temperature and a low Curie temperature layer made of a layer which is rare earth metal magnetization dominant at room temperature, is preferred, since as the temperature is raised, the low curie temperature layer becomes close to the compensation temperature, whereby the magnetization decreases even at a temperature lower than the Curie temperature, and the high Curie temperature layer will depart from the compensation temperature, whereby the magnetization increases.

In order not to be deteriorated under heating by the readout laser beam, the high Curie temperature layer preferably has a Curie temperature of at least 200° C., more preferably at least 250° C. If the Curie temperature is low, the readout power margin will be zero or tends to be narrow. However, if it is too high, the laser power required for writing tends to be very large, and the Curie temperature is preferably not higher than 350° C.

The magnetization of the writing layer having a lower Curie temperature is preferably sufficiently small at the time of transferring the magnetization direction to the readout layer. For this purpose, in reversal type MSR, it is preferably lower than the Curie temperature of the switching layer.

In order to broaden the readout power margin, the two layers preferably have Curie temperatures which are different from each other by at least 20° C., more preferably at least 40° C. If the writing layer is composed of three or more layers, two layers among them may be made to have a difference in the Curie temperature of at least 20° C.

Now, the low Curie temperature layer will be described in detail.

By adjusting the composition and the thickness, the low Curie temperature layer is capable of canceling out the magnetization of the high Curie temperature layer thereby to provide the optimum writing magnetic field dependency. The material to be used for the low Curie temperature layer, may, for example, be TbFeCo, TbCo, TbFe, DyFeCo, TbDyFeCo, GdTbFe, GdDyFe, GdDyFeCo, GdTbFeCo, GdFeCo or GdFe, particularly preferably TbFeCo, DyFeCo or GdFe, or an alloy thereof. Among them, GdFe, DyFeCo or an alloy thereof is particularly preferred, since the coercivity is small, and the transfer of the magnetization from the writing layer can easily be carried out.

If the composition is represented by $R_X(Fe_YCo_{100-Y})_{100-X}$ wherein R is a rare earth metal, X is preferably $23 \leq X \leq 35$, more preferably $25 \leq X \leq 33$, and Y is preferably $60 \leq Y \leq 100$, more preferably $70 \leq Y \leq 100$. Further, the rare earth element R is preferably at least one element selected from the group consisting of Gd, Tb and Dy.

If the low Curie temperature layer is too thin, the magnetic field to be generated tends to be small, whereby it can hardly cancel out the magnetization of the high Curie temperature layer. Accordingly, the thickness is preferably at least 10 nm, more preferably at least 20 nm, particularly preferably at least 25 nm.

On the other hand, if it is too thick, the recording sensitivity tends to be poor, and the transfer of the magnetization direction from the high Curie temperature layer to the low Curie temperature layer tends to be difficult. Accordingly, the thickness is at most 100 nm, more preferably at most 70 nm, particularly preferably at most 60 nm.

In the present invention, the readout layer is preferably of a rare earth metal magnetization dominant composition. In such a case, in reversal type MSR, the direction of the magnetization of the readout layer due to an exchange coupling force will be opposite to the direction of the magnetization of the readout layer due to the magnet static coupling force. Further, in static coupled CAD, an in-plane magnetization film at room temperature will transform to a perpendicular magnetization film at a high temperature due to a decrease in magnetization.

In static coupled CAD, when the transition temperature at which the readout layer becomes a perpendicular magnetization film, is represented by Tp, in order to sufficiently form a low temperature mask, the transition temperature Tp is required to be maintained at a level higher than a certain temperature. Namely, Tp is preferably at least 120° C., more preferably at least 140° C.

The readout layer is preferably such that the Curie temperature is high, and the coercivity is small.

The Curie temperature is preferably at least 250° C., more preferably at least 300° C. Further, the Curie temperature of the readout layer is usually at most 450° C.

The magnetization direction is transferred by magnet static coupling, and the coercivity of the readout layer is preferably at least smaller than the writing layer. A preferred coercivity is from 0 to 500 Oe, more preferably from 0 to 300 Oe, at room temperature.

The magnetization of the readout layer is preferably at least 250 emu/cc at room temperature.

Further, the magnetization of the readout layer is preferably at least 100 emu/cc to 300 emu/cc, at the Curie temperature Tcs of the switching layer in reversal type MSR, or at the temperature Tp at which the magnetization of the readout layer transfers from in-plane to perpendicular, in static coupled CAD.

The material to be used for such a readout layer, may, for example, be an alloy of a rare earth metal and a transition metal, such as GdFeCo, GdCo, GdFe, GdDyFe, GdDyCo, GdDyFeCo, GdTbFe, GdTbCo, TdTbFeCo, DyFeCo, DyCo, TbCo, TbFeCo, TbDyFeCo or TbDyCo.

Among them, it is preferred to employ an alloy containing Gd, from the viewpoint of the Curie temperature or the coercivity. Particularly preferred is GdFeCo or GdFe.

When GdFeCo is used for the readout layer, if the composition is represented by $Gd_X(Fe_YCo_{100-Y})_{100-X}$ (atomic ratio), X is preferably $27 \leq X \leq 37$, more preferably $27 \leq X \leq 35$, most preferably $28 \leq X \leq 33$, and Y is preferably $70 \leq Y \leq 100$, more preferably $75 \leq Y \leq 95$.

A magnetic material such as PtCo or a superlattice of Pt and Co may be laminated on the incident light side of the readout layer. In order to increase the perpendicular magnetic anisotropy of the readout layer, it is preferred to impart a certain degree of a membrane stress to the magnetic layer to form anisotropy due to an inverse magnetic strain effect. The thinner the thickness of the readout layer, the better, as the magnetization can easily be perpendicular. Accordingly, the thickness is preferably at most 100 nm, more preferably at most 70 nm, most preferably at most 60 nm.

However, if the thickness is too thin, the leakage flux tends to be small, and the magnet static coupling force tends to decrease, or the readout light is likely to pass therethrough, whereby the readout signal tends to deteriorate. Accordingly, the thickness is preferably at least 10 nm, more preferably at least 15 nm, most preferably at least 20 nm.

Between the readout layer and the writing layer, a switching layer is provided to cut off the exchange coupling. The switching layer is designed to substantially cut off the exchange coupling force as the medium temperature rises or irrespective of the temperature. In reversal type MSR, a layer having a Curie temperature which is lower than the writing layer and the readout layer, is used to cut off the exchange coupling at a high temperature exceeding the Curie temperature. In static coupled CAD, a mainly non-magnetic or paramagnetic layer is employed to cut off the exchange coupling in all temperature ranges.

In reversal type MSR, the Curie temperature Tcs of the switching layer is preferably from about 90 to 180° C. If Tcs is low, the signal from a region having the magnetic domain transferred and exchange-coupled, tends to be small. On the other hand, if Tcs is high, a high readout power will be required, and accordingly, the sensitivity is lowered in order not to be written by the readout power, and consequently a high writing power will be required. In reversal type MSR, the switching layer is preferably one having a high perpendicular magnetic anisotropy and being capable of providing a strong power for magnetization of the readout layer. The material to be used for such a switching layer is preferably an alloy of a rare earth metal and a transition metal, such as TbFe, TbFeCo, DyFeCo, DyFe or TbDyFeCo.

In static coupled CAD, the switching layer is preferably one which is non-magnetic or paramagnetic at least at the temperature for the transfer of the magnetization direction to the readout layer, such as a metal or a dielectric. For example, it may be Al, Ta, Cr, Ti, W, Si, Pt, Cu, Tb, Gd, Dy, ZnS, a Si nitride such as $Si_3N_4$, AlN, TiN, carbon or carbon hydride. It may be a mixture of these materials. However, one having high magnetic permeability, such as Fe or Ni, is not desirable, since it prevents permeation of magnetic flux from the writing layer to the readout layer and lowers magnet static coupling.

The thickness of the switching layer is preferably at least 2 nm and at most 30 nm. If it is thin, no adequate cutting off of exchange coupling tends to be carried out, and if it is thick, the magnetic flux for magnet static coupling tends to hardly reach.

Further, by an addition of an additive such as Si, Al, Pt, Ti, Cr or Ta in an amount of not more than 10% to each of the above described magnetic layers such as the readout layer, the switching layer and the writing layer, it is possible to lower and adjust the Curie temperature.

Further, a magnetic layer made of an alloy of a rare earth metal and a transition metal, is very susceptible to oxidation, and it is preferred to provide a protective layer on each side of the magnetic layer in order to prevent oxidation.

The material for the protective layer is selected taking into consideration the oxidation resistance, hardness, refractive index, etc. Specifically, a single substance such as silicon oxide, aluminum oxide, tantalum oxide, titanium oxide, silicon nitride, aluminum nitride or silicon carbide, or a mixture thereof, may preferably be employed. The thickness of the protective layer is preferably from about 10 nm to 150 nm. Further, the surface of the protective layer may be subjected to plasma etching, and then, a magnetic layer may be provided, whereby the magnetic anisotropy of the magnetic layer can be improved.

It is preferred to provide a highly thermally conductive material made of a single substance such as Al, Cu, Au or Ag or an alloy thereof as the main component, as a heat dissipating layer on the writing layer side of the magnetic layer directly or via a protective layer, with a view to stabilizing the heat distribution at the time of the readout. The thickness of the heat dissipating layer is preferably from about 10 nm to 100 nm.

In order to make generation of the magnet static coupling force certain, it is preferred to provide a layer having a larger magnetic permeability than the writing layer on the side of the writing layer opposite to the readout layer, directly or via a non-magnetic layer. As such a material, Fe, Ni, Co, FeNi or AlSiFe may, for example, be mentioned. The thickness of the layer is preferably from about 10 to 50 nm. By providing such a layer, leakage flux of the writing layer will be generated more efficiently, and the magnet static coupling force with the readout layer will increase. If such a layer is in direct contact with the writing layer, the perpendicular magnetic anisotropy tends to decrease, and accordingly, it is preferred to provide it via a non-magnetic layer.

The foregoing respective layers can be formed by conventional methods such as sputtering, vapor deposition or CVD.

For the substrate, a resin such as polycarbonate, an acrylic resin or polyolefin, glass, or a metal such as aluminum, may be employed. In a case where the writing/readout light is irradiated through the substrate, the substrate is required to be transparent to the writing/readout light.

The magneto-optical recording medium of the present invention may be formed by laminating, for example, a substrate, a protective layer, a magnetic layer, a protective layer and a heat dissipating layer in this order, so that the writing/readout light may be irradiated via the substrate, or by laminating, for example, a substrate, a heat dissipating layer, a protective layer, a magnetic layer and a protective layer in this order, so that the writing/readout light may be irradiated from the side opposite to the substrate (from the film surface side). In either case, lamination is carried out so that the readout layer is located closer to the incident light side than the writing layer.

In either case, it is preferred to further provide a ultra violet ray-curable or thermosetting resin layer in a thickness of from 1 μm to a few hundred μm as the upper most layer in order to prevent direct contact with air or in order to prevent scratching due to contact with a foreign matter or a writing/readout head. Or, in some cases, a dielectric protective layer having high hardness may be provided, and a resin layer may further be provided thereon.

Still further, it is possible to provide a layer made of a very thin metal or semiconductor as a semitransparent film between the substrate and the protective layer in the case of substrate side incidence or on the protective layer in the case of the incidence from the side opposite to the substrate, to control the amount of light energy entering into the writing layer.

In either case, a laser beam such as a semiconductor laser or a gas laser, is usually employed as the writing/readout light, and its wavelength is usually from 400 to 800 nm.

In a case where magnetic field modulation writing is carried out by introducing a light from the substrate side, it is usual that an optical head is disposed on the substrate side, and a flying magnetic head is disposed on the film surface side. In a case where writing is carried out by introducing a light from the film surface side, it is preferred that a flying magnetic head having a light-emitting hole or objective lens, is disposed on the film surface side.

The present invention is directed to a method of increasing the magnet static coupling force without deteriorating the writing magnetic field dependency and is thus applicable not only to a medium designed to transfer the magnetization direction of the writing layer to the readout layer solely by the magnet static coupling force but also to a medium wherein the magnet static coupling force will assist the exchange coupling force, such as a RAD medium or a double mask RAD medium.

Further, the magneto-optical recording medium of the present invention can be applied to various writing formats without any particular restriction. For example, in a case where a groove is formed spirally or concentrically on a substrate and writing is carried out along this groove, the present invention is applicable to any one of groove writing wherein writing is carried out in the groove, land writing wherein writing is carried out on the land between the grooves and land and groove writing wherein writing is carried out on both.

Now, the writing and readout apparatus employing the above described magneto-optical recording medium will be described.

The writing and readout apparatus include a conventional so-called substrate side incidence system wherein an optical head is provided on the side of the optical disk substrate opposite to the writing surface, and a readout light or a writing light emitted from the optical head, will pass through the substrate and reach the writing surface, and a film surface side incidence system wherein an optical head is provided on the writing surface side, which has been proposed in recent years. The latter is preferred for high density writing and high speed readout.

In the substrate side incidence system, the optical head is provided with an objective lens which is controlled to an optic axial direction by an actuator so that the light will focus on the writing surface, and accordingly, the optical head and the disk are distanced usually for about 1 mm. In the case of magnetic field modulation, a flying magnetic head or a contact magnetic head is usually provided on the writing surface side.

In the film surface side incidence system, a single sheet or concentrically fixed at least two sheets of optical disks are built in, and an optical head is provided to face each writing surface, so that the light is irradiated from the writing surface side without passing through the substrate. A flying type magnetic head or a contact type magnetic head to be used for magnetic field modulation will also be provided on the writing surface side.

With a conventional substrate side incidence system, it was impossible to increase the numerical aperture of the objective lens, since the aberration of the beam spot tended to increase due to e.g. irregularities in the thickness of the substrate or the inclination of the substrate. Whereas, by employing the film surface side incidence, it is possible to increase the numerical aperture of the objective lens and to reduce the beam spot, whereby an increase of the capacity of the optical disk and a high speed access such as a hard disk will be possible.

Now, the present invention will be described in further detail with reference to Examples. However, it should be understood that the present invention is by no means restricted to such specific Examples.

As the substrate for the preparation of the magneto-optical recording medium, a substrate made of polycarbonate and having a thickness of 1.2 mm, was employed. On the substrate, a guide groove was spirally formed with a track pitch of 0.85 μm, by injection molding.

In the following Examples, the writing/readout light was irradiated from the substrate side of the magneto-optical recording medium thus prepared, to carry out groove writing.

Further, light intensity modulation was carried out as follows. Using an evaluation machine having an optical head with a wavelength of 680 nm and a numerical aperture of 0.55 mounted thereon, writing was carried out by modulating the writing light at a frequency of 10.53 MHz at a linear velocity of 8 m/s. This corresponds to writing with a writing mark length of 0.38 μm.

Further, magnetic field modulation was carried out as follows. Using an evaluation machine having an optical head with a wavelength of 680 nm and a numerical aperture of 0.55, and a flying magnetic head mounted thereon, writing was carried out by continuously irradiating a writing light of 7 mW while modulating the writing magnetic field with a frequency of 10.53 MHz at a linear velocity of 8 m/s.

The readout was carried out by an optical system with a wavelength of 680 nm and a numerical aperture of 0.55.

EXAMPLE 1

(Reversal Type MSR Medium)

To prepare a reversal type MSR medium, a polycarbonate substrate having a guide groove with a track pitch of 0.85 μm, was introduced into a sputtering apparatus, which was then evacuated to a vacuum degree of at most $5 \times 10^{-5}$ Pa. Then, as a protective layer, 80 nm of Ta oxide was formed on the substrate by reactive sputtering. Then, on the Ta oxide, 30 nm of a readout layer made of $Gd_{35}(Fe_{80}Co_{20})_{65}$, 10 nm of a switching layer made of $Tb_{20}(Fe_{95}Co_5)_{80}$, 30 nm of a first writing layer made of $Gd_{22}(Fe_{80}Co_{20})_{78}$, and 80 nm of a second writing layer made of $Tb_{26}(Fe_{80}Co_{20})_{74}$, were formed. Finally, 50 nm of a protective layer made of SiN was formed.

The Curie temperatures of the readout layer, the switching layer, the first writing layer and the second writing layer were measured and found to be at least 300° C., 150° C., at least 300° C. and 270° C., respectively.

With the readout layer, the magnetization of rare earth metal was dominant at room temperature. With the switching layer, the magnetization of transition metal was dominant at room temperature. The first writing layer was transition metal magnetization dominant at room temperature, and its coercivity was substantially zero. The second writing layer was rare earth metal magnetization dominant at room temperature, and its coercivity was 8 kOe. The magnetization of the overall writing layer was rare earth metal magnetization dominant at room temperature and was 50 emu/cc.

On the disk thus prepared, firstly, light intensity modulation writing was carried out.

Evaluation of the CN ratio was carried out by means of an evaluation machine with a wavelength of 680 nm and a numerical aperture of 0.55. Writing was carried out by modulating the writing light under writing conditions being a linear speed of 8 m/s and a frequency of 10.53 MHz (mark length: 0.38 μm). Before the writing, erasing was carried out by applying a magnetic field of 300 Oe in an erasing direction with an erasing power of 8 mW.

When the readout power Pr was 1.5 mW, the readout was usual (non-super dissolution readout), whereby the CN ratio was 28 dB, and when Pr was at least 2.6 mW, the effects for super dissolution appeared. When Pr was 3.0 mW, the CN ratio became maximum, whereby 49.5 dB was obtained.

Figure 3:
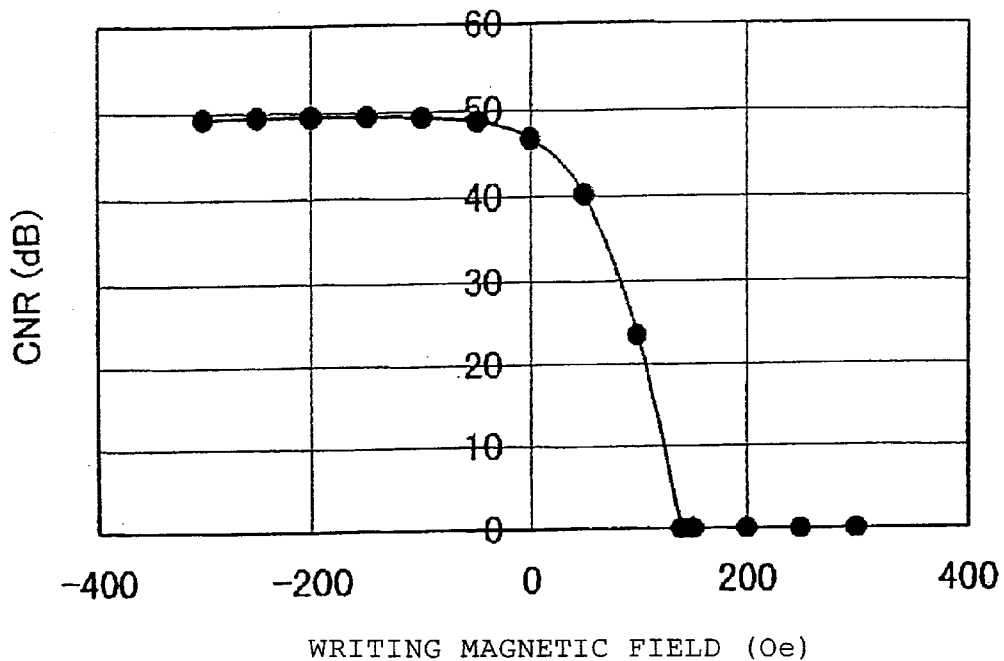
FIG. 3 is a graph showing the writing magnetic field dependency by light intensity modulation in Example 1.

While changing the intensity of the writing magnetic field (Hw), the change of the CN ratio was measured, and the results are shown in FIG. 3.

The writing power was set so that the maximum CN ration was obtained. Symbol + indicates the direction of the erasing magnetic field, and symbol − indicates the direction of the writing magnetic field. To be useful for the magnetic field modulation, the magnetization must be accurately directed in the direction of the writing magnetic field, and it is necessary that the CN ratio will be saturated with a low writing direction magnetic field and that the CN ratio decreases (i.e. no writing is carried out) with a low erasing direction magnetic field.

When the magnetic field intensity where the CN ratio in the writing direction magnetic field becomes within a range of 1 dB from the maximum value, is represented by Hw1, and the magnetic field intensity where no writing is carried out in the erasing direction magnetic field, is represented by Hw2, Hw1 was −50 Oe, and Hw2 was 140 Oe.

Figure 4:
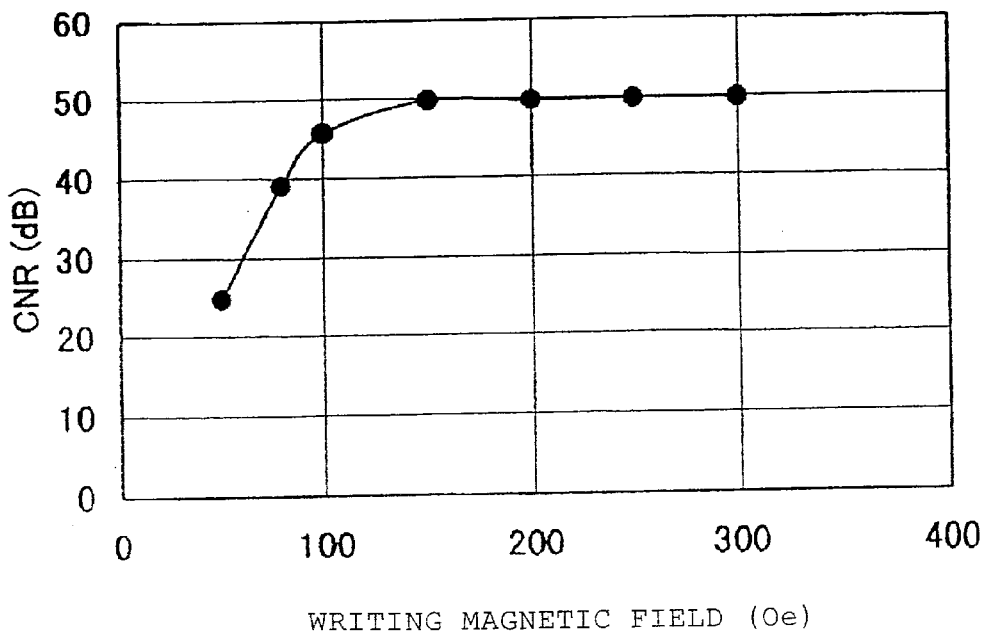
FIG. 4 is the writing magnetic field dependency by magnetic field modulation in Example 1.

Then, using a flying magnetic head, magnetic field modulation writing was carried out. The readout optical system was the same as used for the light intensity modulation. Writing was carried out by continuously irradiating a writing light of 7 mW at the same linear velocity as in the light intensity modulation while applying a writing magnetic field having the same frequency as the writing light pulse for the light intensity modulation. The results are shown in FIG. 4. In the writing magnetic field of 150 Oe, a CN ratio of 49.8 dB was obtained.

EXAMPLE 2
(Reversal Type MSR Medium)

A disk was prepared in the same manner as in Example 1 except that the composition of the first writing layer was changed to $Gd_{17}(Fe_{80}Co_{20})_{83}$, and the composition of the second writing layer was changed to $Tb_{31}(Fe_{80}Co_{20})_{69}$. The magnetization of the entire writing layer was transition metal magnetization dominant at room temperature and was 80 emu/cc.

This disk was evaluated by light intensity modulation writing in the same manner as in Example 1, whereby Hw1 was −120 Oe, and Hw2 was 280 Oe, and the maximum CN ratio was 46.4 dB.

The Curie temperatures of the first writing layer and the second writing layer were measured and found to be at least 300° C. and 260° C., respectively. The first writing layer was transition metal magnetization dominant at room temperature, and its coercivity was almost zero. The second writing layer was rare earth metal magnetization dominant at room temperature, and its coercivity was 2.5 kOe. The magnetization of the entire writing layer was transition metal magnetization dominant at room temperature and was 80 emu/cc.

EXAMPLE 3
(Static Coupled CAD Medium)

To prepare a static coupled CAD medium, a polycarbonate substrate having a guide groove with a track pitch of 0.85 μm, was introduced into a sputtering apparatus, which was then evacuated to a vacuum degree of at most $5 \times 10^{-5}$ Pa. Then, as a protective layer, 80 nm of Ta oxide was formed on the substrate by reactive sputtering. Then, on the Ta oxide, 30 nm of a readout layer made of $Gd_{32}(Fe_{80}Co_{20})_{68}$, 10 nm of a switching layer made of $Si_3N_4$, 30 nm of a first writing layer made of $Gd_{20}(Fe_{80}Co_{20})_{78}$, and 60 nm of a second writing layer made of $Tb_{28}(Fe_{80}Co_{20})_{74}$, were formed. Finally, 50 nm of a protective layer made of $Si_3N_4$ was formed.

The Curie temperatures of the readout layer, the first writing layer and the second writing layer were measured and found to be higher than 300° C., higher than 300° C. and 270° C., respectively.

With the readout layer, the magnetization of rare earth metal was dominant at room temperature. The first writing layer was transition metal magnetization dominant at room temperature, and its coercivity was almost zero. With the second writing layer, rare earth metal magnetization was dominant at room temperature, and its coercivity was 5 kOe. The magnetization of the overall writing layer was transition metal magnetization dominant at room temperature and was 40 emu/cc.

On the disk thus prepared, firstly, light intensity modulation writing was carried out.

Evaluation of the CN ratio was carried out by means of an evaluation machine with a wavelength of 680 nm and a numerical aperture of 0.55. Writing was carried out by modulating the writing light under writing conditions being a linear velocity of 8 m/s and a frequency of 10.53 Mhz (mark length: 0.38 μm). Before the writing, erasing was carried out by applying a magnetic field of 300 Oe in an erasing direction with an erasing power of 8 mW.

When the readout power Pr was 1.5 mW, the readout was usual, and the CN ratio was 26 dB. When Pr was at least 2.8 mW, the effects for super dissolution appeared. When Pr was 2.8 mW, the CN ratio became maximum, whereby 42.3 dB was obtained. While changing the intensity of the writing magnetic field (Hw), the change of the CN ratio was measured. The writing power was set so that the maximum CN ratio was obtained. Hw1 was −80 Oe, and Hw2 was 170 Oe.

Figure 5:
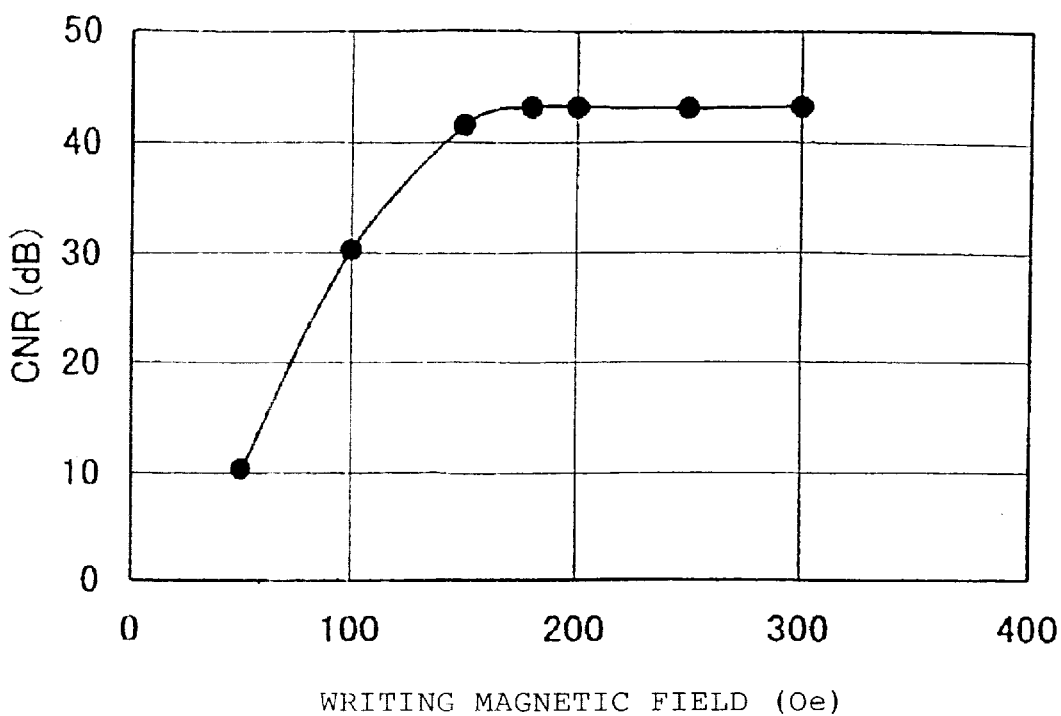
FIG. 5 is a graph showing the writing magnetic field dependency by magnetic field modulation in Example 3.
Figure 6:
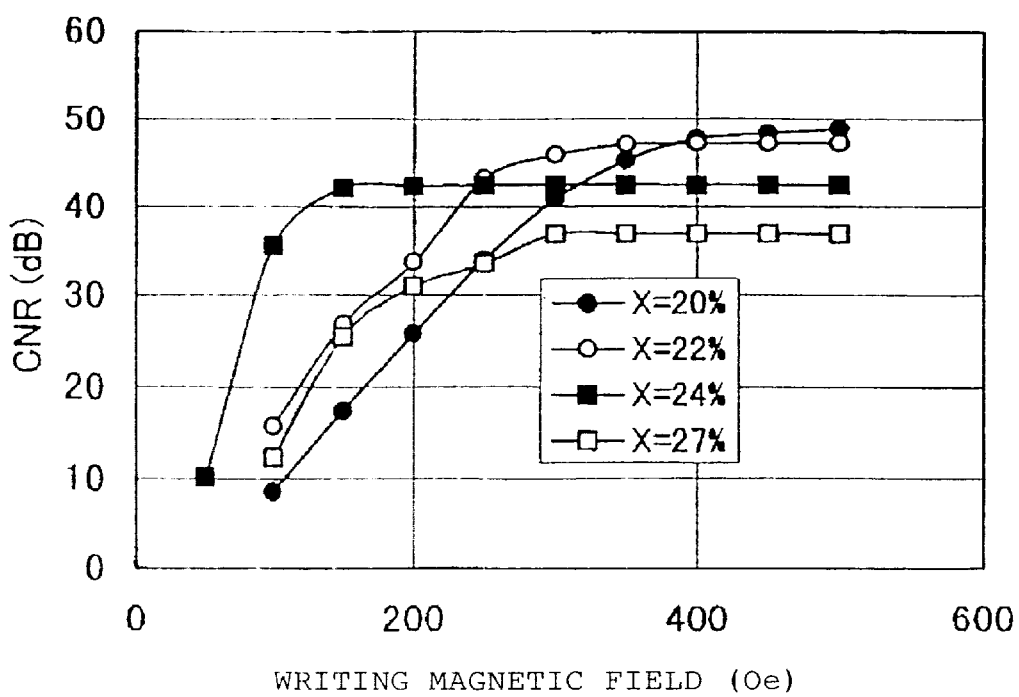
FIG. 6 is a graph showing the writing magnetic field dependency by magnetic field modulation in Comparative Example 1.

Then, magnetic field modulation writing was carried out by means of a flying magnetic head. The readout optical system was the same as used for the light intensity modulation. Writing was carried out by continuously irradiating a writing light of 7 mW at the same linear velocity as in the light intensity modulation, while applying a writing magnetic field of the same frequency as the writing light pulse for the light intensity modulation. The results are shown in FIG. 5. In a writing magnetic field of 180 Oe, a CN ratio of 43.2 dB was obtained.

EXAMPLE 4
(Reversal Type MSR Medium)

A disk was prepared in the same manner as in Example 1 except that the first writing layer and the second writing layer were changed to 80 nm of a first writing layer made of $Tb_{20}(Fe_{80}Co_{20})_{80}$ and 30 nm of a second writing layer made of $Gd_{30}(Fe_{80}Co_{20})_{70}$. The Curie temperatures of the first writing layer and the second writing layer were measured and found to be 270° C. and higher than 300° C., respectively.

The first writing layer was transition metal magnetization dominant at room temperature, and its coercivity was 7.5 kOe. With the second writing layer, rare earth metal magnetization was dominant at room temperature, and its coercivity was almost zero. The magnetization of the overall writing layer was transition metal magnetization dominant at room temperature and was 50 emu/cc. Namely, the coercivity of the rare earth metal magnetization dominant layer was reduced.

This disk was evaluated in the same manner as in Example 1, whereby Hw1 was −80 Oe, and Hw2 was 250 Oe, and the maximum CN ratio was 48.8 dB.

Comparative Example 1
(Reversal Type MSR Medium)

To prepare a reversal type MSR medium, a polycarbonate substrate having a guide groove with a track pitch of 0.85 μm, was introduced into a sputtering apparatus, which was then evacuated to a vacuum degree of at most $5\times10^{-5}$ Pa. Then, as a protective layer, 80 nm of Ta oxide was formed on the substrate by reactive sputtering. Then, on the Ta oxide, 30 nm of a readout layer made of $Gd_{35}(Fe_{80}Co_{20})_{65}$, 10 nm of a switching layer made of $Tb_{20}(Fe_{95}Co_5)_{80}$, and 80 nm of a writing layer made of $Tb_X(Fe_{80}Co_{20})_{100-X}$, were formed. Finally, 50 nm of a protective layer made of SiN was formed. X was changed from 20 to 27(%).

The Curie temperatures of the readout layer, the switching layer and the writing layer were measured and found to be at least 300° C., 150° C. and 270° C., respectively.

With the readout layer, the magnetization of rare earth metal was dominant at room temperature. With the switching layer, the magnetization of transition metal was dominant at room temperature. The writing layer had a compensation composition in the vicinity of X=24(%) at room temperature.

The disks thus prepared were evaluated by light intensity modulation in the same manner as in Example 1. The results are shown in Table 1

TABLE 1

| Characteristics of Comparative Example 1 by light intensity modulation | | | | | |
|---|---|---|---|---|---|
| X | (%) | 20 | 22 | 24 | 27 |
| Hw1 | (Oe) | 100 | −20 | −100 | −250 |
| Hw2 | (Oe) | 550 | 350 | 120 | −40 |
| CNR | (dB) | 48.5 | 47.1 | 40.2 | 35.3 |

Then, magnetic field modulation writing was carried out by means of a flying magnetic head. The readout optical system was the same as used in the light intensity modulation. Writing was carried out by continuously irradiating a writing light of 7 mW at the same linear velocity as in the light intensity modulation while applying a writing magnetic field of the same frequency as the writing light pulse in the light intensity modulation. However, there was none whereby writing was possible with a low magnetic field and a high CN ratio was obtainable.

EXAMPLE 5
(Reversal Type MSR Medium)

A substrate was introduced into a sputtering apparatus, which was then evacuated to a vacuum degree of at most $5\times10^{-5}$ Pa. Then, by means of reactive sputtering, Ta oxide was formed in a thickness of 80 nm as a protective layer on the substrate. Then, on the Ta oxide, 30 nm of a readout layer made of $Gd_{33}(Fe_{80}Co_{20})_{67}$, 10 nm of a switching layer made of $Tb_{21}(Fe_{92}Co_8)_{79}$, 50 nm of a first writing layer made of $Tb_{20}(Fe_{80}Co_{20})_{80}$, and 30 nm of a second writing layer made of $Dy_{28}(Fe_{88}Co_{12})_{72}$ were formed. Finally, 50 nm of a protective layer made of Si nitride was formed.

The Curie temperatures of the readout layer, the switching layer and the writing layers were measured and found to be higher than 300° C., 180° C., 270° C. and 160° C., respectively. With the readout layer, rare earth metal magnetization was dominant at room temperature, and its coercivity was almost zero. With the switching layer, transition metal magnetization was dominant at room temperature, and its coercivity was 8 kOe. With the first writing layer, transition metal magnetization was dominant at room temperature, and its coercivity was 7 kOe. The second writing layer was rare earth metal magnetization dominant at room temperature, and its coercivity was 3 kOe.

The volume saturation magnetization Ms at room temperature of the readout layer and the writing layers were measured and found to be 330 emu/cc, 170 emu/cc and 260 emu/cc, respectively. The overall magnetization of the two writing layers was transition metal magnetization dominant at room temperature and was 70 emu/cc which was sufficiently small.

The disk thus prepared was subjected to light intensity modulation writing, followed by readout to measure the CNR (CN ratio).

When the readout power Pr was 1.5 mW, the readout was usual i.e. not super resolution readout, and the CN ratio was 28 dB. When Pr was at least 2.6 mW, the effects for super resolution appeared, and when Pr was 3.0 mW, the CN ratio became maximum, whereby 49.2 dB was obtained. At Pr=2.6 mW where super resolution appeared, the first writing layer was heated to a temperature of at least 180° C. which was the Curie temperature of the switching layer.

Then, the writing power was set so that the maximum CN ratio was obtained, and writing was carried out while changing the writing magnetic field intensity, and the change of the CN ratio of the readout signal was measured.

Figure 7:
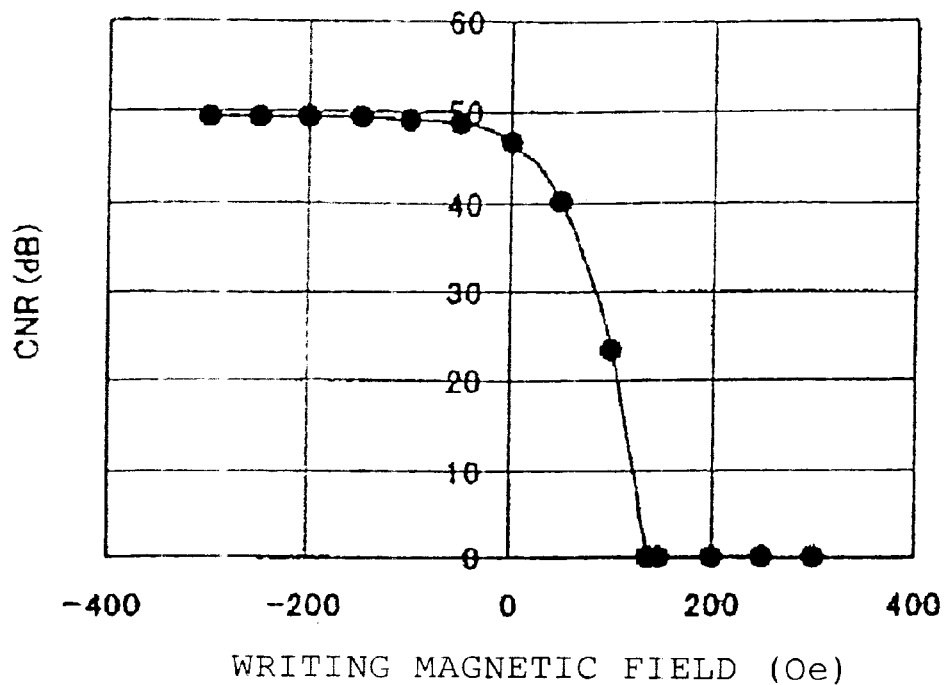
FIG. 7 is a graph showing the writing magnetic field dependency of the CN ratio by light intensity modulation in Example 5.

FIG. 7 is a graph showing the writing magnetic field dependency of the CN ratio. The erasing magnetic field direction is indicated by +, and the writing magnetic field direction is indicated by −.

When the magnetic field intensity where the CN ratio in the writing direction magnetic field becomes within 1 dB from the maximum value, is represented by Hw1, Hw1 was −50 Oe. Namely, in a low writing direction magnetic field, the CN ratio was saturated.

Further, when the magnetic field intensity where the CN ratio in the erasing direction magnetic field becomes zero dB, is represented by Hw2, Hw2 was 140 Oe. Namely, in a low erasing direction magnetic field, the CN ratio decreased, thus indicating that in a low erasing direction magnetic field, no writing would be carried out.

To carry out writing by a magnetic field modulation system, the magnetization of the first writing layer must be directed precisely in the writing magnetic field direction. Therefore, it is necessary that in a low writing direction magnetic field, the CN ratio will be saturated, and in a low erasing direction magnetic field, the CN ratio decreases (i.e. no writing will be carried out). This disk fully satisfies such a requirement.

Figure 8:
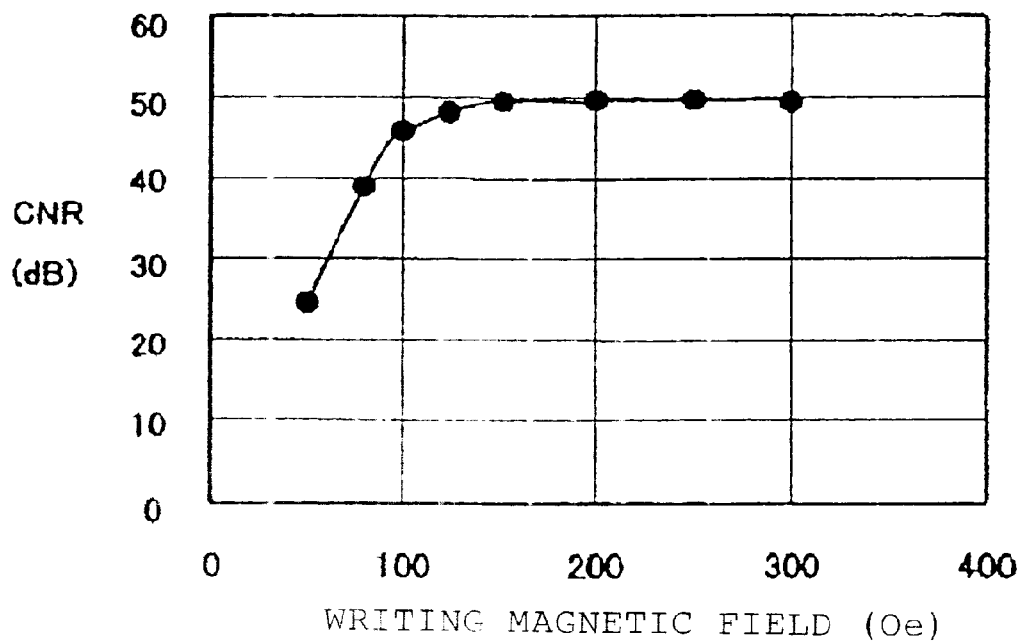
FIG. 8 is a graph showing the writing magnetic field dependency of the CN ratio by magnetic field modulation in Example 5.

Then, this disk was subjected to magnetic field modulation writing and then readout to measure the CN ratio. FIG. 8 is a graph showing the writing magnetic field dependency of the CN ratio. In a low writing magnetic field of 150 Oe, the CN ratio was saturated, and thus, it was found that writing was carried out with a low writing magnetic field.

Comparative Example 2
(Reversal Type MSR Medium)

A disk was prepared in the same manner as in Example 5 except that no second writing layer was formed, and the composition of the first writing layer was changed to $Tb_X(Fe_{80}Co_{20})_{100-X}$. The amount of Tb was changed from 20 atomic % to 27 atomic %. The first writing layer had a compensation composition in the vicinity of the amount X of Tb being 24 atomic % at room temperature, and it was transition metal magnetization dominant when X was lower than that, and rare earth metal magnetization dominant when X was higher than that.

The disks thus prepared were evaluated by light intensity modulation in the same manner as in Example 5. The results are shown in Table 2. Both Hw1 and Hw2 were low, and there was none whereby a high CN ratio was obtained.

TABLE 2

| X | (%) | 20 | 22 | 24 | 27 |
|---|---|---|---|---|---|
| Hw1 | (Oe) | 100 | −20 | −100 | −250 |
| Hw2 | (Oe) | 550 | 350 | 120 | −40 |
| CNR | (dB) | 48.5 | 47.1 | 40.2 | 35.3 |

Figure 9:
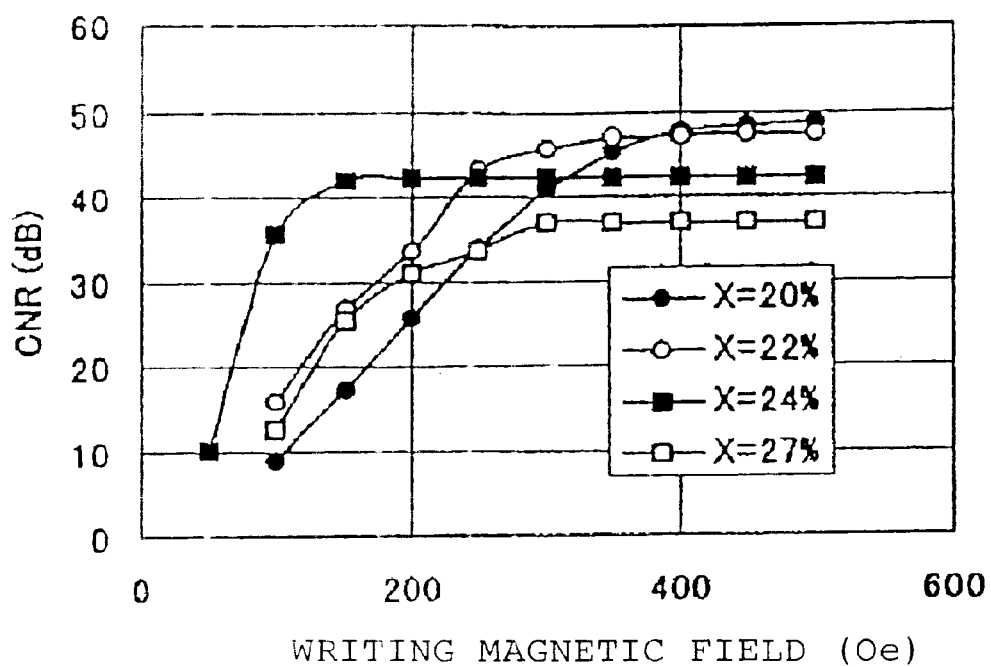
FIG. 9 is a graph showing the writing magnetic field dependency of the CN ratio by magnetic field modulation in Comparative Example 2.

Then, these disks were subjected to magnetic field modulation writing and then readout to measure the CN ratios. FIG. 9 is a graph showing the writing magnetic field dependency of the CN ratio. There was none whereby writing was possible with a low magnetic field and a high CN ratio was obtainable.

Comparative Example 3
(Reversal Type MSR Medium)

A disk was prepared in the same manner as in Example 5 except that the composition of the second writing layer was changed to $Dy_{20}(Fe_{88}Co_{12})_{80}$. The second writing layer had a Curie temperature of 160° C., and it was transition metal magnetization dominant at room temperature and had a coercivity of 5 kOe and a magnetization of 180 emu/cc.

This disk was subjected to light intensity modulation writing and evaluated in the same manner as in Example 5. Hw1 was 120 Oe, and Hw2 was 480 Oe. Thus, both Hw1 and Hw2 were very high.

Further, magnetic field modulation writing was carried out in the same manner as in Example 5, whereby the CN ratio was not saturated with a writing magnetic field of at most 400 Oe. Namely, with a low magnetic field, no adequate writing was carried out.

What is claimed is:

1. A magneto-optical recording medium comprising:
   a writing layer having a plurality of layers which are made of alloys of a rare earth metal and a transition metal and which are exchange-coupled one to another, including a first layer having rare earth metal dominant magnetization at room temperature and a second layer having transition metal dominant magnetization at room temperature;
   a readout layer disposed on a substrate; and
   a switching layer disposed between the writing layer and the readout layer,
   wherein a magnetization direction corresponding to information is written in the writing layer, and a magnetization direction of the writing layer is transferred to the readout layer by a magnet static coupling force at a temperature not lower than room temperature, so the dominant magnetization of the first layer and the dominant magnetization of the second layer point in opposite directions.

2. The magneto-optical recording medium according to claim 1, wherein a layer in the writing layer, which is closest to the readout layer, has transition metal dominant magnetization at room temperature.

3. The magneto-optical recording medium according to claim 1, wherein a coercivity of the first layer having rare earth metal dominant magnetization at room temperature is higher than a coercivity of the second layer having transition metal dominant magnetization at room temperature.

4. The magneto-optical recording medium according to claim 1, wherein among the plurality of layers in the writing layer, a layer having a lowest coercivity at room temperature is made of GdFeCo, GdFe or GdCo.

5. The magneto-optical recording medium according to claim 1, wherein among the plurality of layers in the writing layer, a layer having a lowest coercivity at room temperature has a coercivity of almost 0.

6. The magneto-optical recording medium according to claim 1, wherein the writing layer and the readout layer are exchange-coupled each other at room temperature, and at a temperature higher than a predetermined level, the exchange coupling of the writing layer and the readout layer is substantially cutoff, and the magnetization direction of the writing layer is transferred to the readout layer by the magnet static coupling force from the writing layer, and wherein the writing layer includes a low Curie temperature layer having a Curie temperature of not higher than 200° C.

7. The magneto-optical recording medium according to claim 6, wherein the low Curie temperature layer has a Curie temperature lower than the switching layer.

8. A writing method for a magneto-optical recording medium, comprising:
   modulating information with a magnetic field modulation system; and
   writing the information on a magneto-optical recording medium including,
      a writing layer having a plurality of layers which are made of alloys of a rare earth metal and a transition metal and which are exchange-coupled one to another, including a first layer having rare earth metal dominant magnetization at room temperature and a second layer having transition metal dominant magnetization at room temperature,
      a readout layer disposed on a substrate, and
      a switching layer disposed between the writing layer and the readout layer, wherein a magnetization direction corresponding to information is written in the writing layer, and a magnetization direction of the writing layer is transferred to the readout layer by a magnet static coupling force at a temperature not lower than room temperature, so the dominant magnetization of the first layer and the dominant magnetization of the second layer point in opposite directions.

9. The writing method according to claim 8, wherein a magnetic field intensity for writing is at most 300 Oe.

10. A writing and readout method, comprising:

reading information on a magneto-optical recording medium including,
- a writing layer having a plurality of layers which are made of alloys of a rare earth metal and a transition metal and which are exchange-coupled one to another, including a first layer having rare earth metal dominant magnetization at room temperature and a second layer having transition metal dominant magnetization at room temperature,
- a readout layer disposed on a substrate, and
- a switching layer disposed between the writing layer and the readout layer, wherein a magnetization direction corresponding to information is written in the writing layer, and a magnetization direction of the writing layer is transferred to the readout layer by a magnet static coupling force at a temperature not lower than room temperature, so the dominant magnetization of the first layer and the dominant magnetization of the second layer point in opposite directions, wherein the writing layer and the readout layer are exchange-coupled to each other at room temperature, and at a temperature higher than a predetermined level, the exchange coupling of the writing layer and the readout layer is substantially cutoff, and the magnetization direction of the writing layer is transferred to the readout layer by the magnet static coupling force, and wherein the writing layer has a Curie temperature of not higher than 200° C.; and heating at a time of readout a medium at a temperature not lower than the Curie temperature of one layer in the writing layer and not higher than the Curie temperature of another layer in the writing layer.

11. A writing and readout apparatus comprising:

a magneto-optical recording medium; and a flying or contact magnetic head, wherein the magneto-optical recording medium includes,
- a writing layer having a plurality of layers which are made of alloys of a rare earth metal and a transition metal and which are exchange-coupled one to another, including a first layer having rare earth metal dominant magnetization at room temperature and a second layer having transition metal dominant magnetization at room temperature,
- a readout layer disposed on a substrate, and
- a switching layer disposed between the writing layer and the readout layer, wherein a magnetization direction corresponding to information is written in the writing layer, and a magnetization direction of the writing layer is transferred to the readout layer by a magnet static coupling force at a temperature not lower than room temperature, so that the dominant magnetization of the first layer and the dominant magnetization of the second layer point in opposite directions.

* * * * *